United States Patent
Nobili

(10) Patent No.: US 7,314,189 B2
(45) Date of Patent: Jan. 1, 2008

(54) DELIVERY SYSTEM FOR TREATED WATER, SHOWERHEAD AND SUPPLY PIPE FOR SAID SYSTEM

(76) Inventor: Fabrizio Nobili, Zona Industriale, San Vittore (CH) CH-6534

( * ) Notice: Subject to any disclaimer, the term of this patent is extended or adjusted under 35 U.S.C. 154(b) by 266 days.

(21) Appl. No.: 10/811,943

(22) Filed: Mar. 30, 2004

(65) Prior Publication Data

US 2005/0161533 A1 Jul. 28, 2005

(30) Foreign Application Priority Data

Jan. 26, 2004 (EP) ................................ 04425045

(51) Int. Cl.
*B05B 1/30* (2006.01)
(52) U.S. Cl. ...................... 239/569; 239/549
(58) Field of Classification Search ................ 239/574, 239/391, 397, 443, 444, 445, 447, 588, 600, 239/530, 586, 562, 442, 195, 549, 569; 138/109, 138/114, 115, 116, 117, 104, 108, 112; 285/123.1, 285/123.2, 123.3, 238–259; 222/144.5
See application file for complete search history.

(56) References Cited

U.S. PATENT DOCUMENTS

| | | | |
|---|---|---|---|
| 712,868 A | 11/1902 | Traxton | |
| 738,486 A | 9/1903 | Rogers | |
| 816,517 A | 3/1906 | Whalen | |
| 1,835,723 A * | 12/1931 | Salzer | ...................... 239/416.4 |
| 2,984,419 A * | 5/1961 | Mcouat | ...................... 239/129 |
| 3,853,761 A | 12/1974 | McClory | |
| 3,929,287 A * | 12/1975 | Givler et al. | ................ 239/381 |
| 4,107,046 A | 8/1978 | Corder | |
| 4,162,028 A * | 7/1979 | Reichenberger | ........... 222/129.4 |
| 4,172,796 A | 10/1979 | Corder | ........................ 210/238 |
| 4,378,124 A * | 3/1983 | Weirich et al. | ........... 285/124.4 |
| 4,629,125 A | 12/1986 | Liu | ............... 239/443 |
| 4,770,768 A | 9/1988 | Lang | |
| 4,863,103 A | 9/1989 | Gannaway | |
| 4,907,744 A * | 3/1990 | Jousson | ....................... 239/449 |
| 5,020,569 A | 6/1991 | Agresta | |
| 5,145,114 A * | 9/1992 | Monch | ........................ 239/126 |
| 5,152,464 A | 10/1992 | Farley | |
| 5,417,348 A * | 5/1995 | Perrin et al. | .............. 222/129.1 |

(Continued)

FOREIGN PATENT DOCUMENTS

DE 25 39 210 3/1977

(Continued)

*Primary Examiner*—Kevin Shaver
*Assistant Examiner*—Trevor McGraw
(74) *Attorney, Agent, or Firm*—Seed IP Law Group PLLC

(57) ABSTRACT

A water delivery system is disclosed comprising a showerhead featuring two delivery points, at least one of which has an own on-off valve, and at least a supply tube carrying untreated water, wherein the showerhead features two separate conduits connecting the two delivery points with a coupling at the base of the showerhead handle, the tube featuring inside at least one secondary supply pipe carrying treated water, a proximal end of said tube being coupled with a coupling of said showerhead and one distal end thereof being intended to disappear from the user's sight, said distal end featuring two distinct supply ends to be connected with a distribution system of untreated water and to a centralised distribution system of treated water, respectively.

18 Claims, 3 Drawing Sheets

U.S. PATENT DOCUMENTS

| | | | | |
|---|---|---|---|---|
| 5,467,927 A | * | 11/1995 | Lee | 239/383 |
| 5,545,322 A | * | 8/1996 | Cheng | 210/440 |
| 5,735,467 A | | 4/1998 | Lee | |
| 5,744,033 A | | 4/1998 | Bertrand et al. | |
| 5,823,229 A | | 10/1998 | Bertrand et al. | |
| 5,853,130 A | | 12/1998 | Ellsworth | 239/548 |
| 5,858,215 A | * | 1/1999 | Burchard et al. | 210/87 |
| 5,865,209 A | * | 2/1999 | Vidal | 137/216 |
| 5,884,808 A | | 3/1999 | Muderlak et al. | 222/23 |
| 5,888,381 A | | 3/1999 | Primdahl et al. | 210/87 |
| 5,976,362 A | | 11/1999 | Wadsworth et al. | |
| 5,983,938 A | | 11/1999 | Bowers et al. | 137/625.17 |
| 5,993,648 A | * | 11/1999 | Hunter et al. | 210/94 |
| 6,000,626 A | | 12/1999 | Futo et al. | 239/74 |
| 6,003,170 A | * | 12/1999 | Humpert et al. | 4/623 |
| 6,074,552 A | | 6/2000 | Allen | 210/138 |
| 6,093,313 A | * | 7/2000 | Bovaird et al. | 210/94 |
| 6,145,757 A | * | 11/2000 | Knapp | 239/443 |
| 6,290,147 B1 | | 9/2001 | Bertrand et al. | 239/444 |
| 6,368,503 B1 | * | 4/2002 | Williamson et al. | 210/282 |
| 6,517,720 B1 | * | 2/2003 | Aldred et al. | 210/282 |
| 6,696,944 B2 | | 2/2004 | Knittle | 340/540 |
| 6,742,725 B1 | * | 6/2004 | Fan | 239/525 |
| 6,892,952 B2 | | 5/2005 | Chang et al. | 236/12.12 |
| 2004/0164183 A1 | | 8/2004 | Nobili | 239/449 |

FOREIGN PATENT DOCUMENTS

| | | |
|---|---|---|
| DE | 28 43 666 A 1 | 4/1980 |
| DE | 36 43 320 A 1 | 7/1988 |
| DE | 39 39 568 C 1 | 12/1990 |
| EP | 0 113 525 B1 | 7/1984 |
| EP | 1 132 141 A2 | 9/2001 |
| EP | 1 577 016 A1 | 9/2005 |
| FR | 2 683 745 A1 | 5/1993 |
| GB | 1 253 959 | 11/1971 |
| WO | 02/098569 A1 | 12/2002 |

* cited by examiner

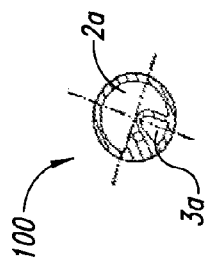
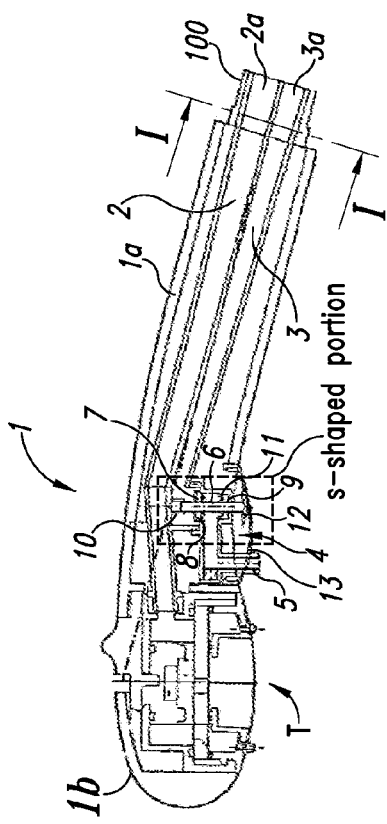
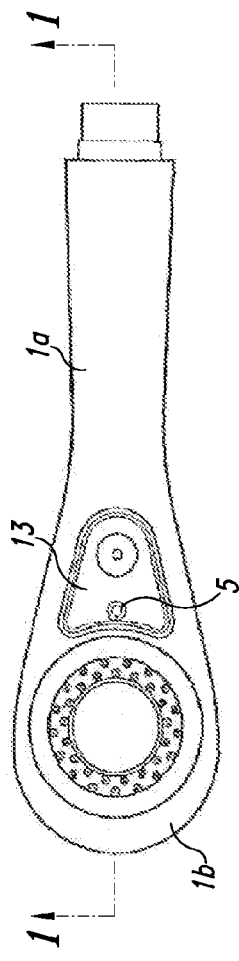
FIG. 1A
FIG. 1
FIG. 2

DELIVERY SYSTEM FOR TREATED WATER, SHOWERHEAD AND SUPPLY PIPE FOR SAID SYSTEM

BACKGROUND OF THE INVENTION

1. Field of the Invention

The present invention relates to a water delivery system equipped with a showerhead and a hose pipe, particularly to a system for the differentiated delivery of treated and untreated water.

2. Description of the Related Art

As known, in correspondence with sinks, washing basins and other sanitary appliances, showerheads of diverse shapes and operation modes are used to deliver water.

In particular, in the case of a water main not being to the user's taste and/or within potable limits (because too calcareous, or microbiologically impure, or otherwise), there exists the need to supply water treated by suitable filtering devices. To that purpose various solutions have been devised.

An effective solution incorporates a suitable centralized system, for example one equipped with activated charcoal filters, deflecting water from the main system, to allow a user to draw drinking water whenever required. This system is normally installed in an inconspicuous location of the house (for example in a utility room, or externally, or even enclosed in a cupboard) and from said system departs a supply pipe, ending at an easily accessible location, for example near a sink, with a self-contained outlet in addition to the taps and showerhead belonging to the main system. However, this solution requires an additional output assembly (taps, plus showerhead or spout) as well as the standard fittings of the untreated water system, which entails not only purchasing and installation expenses, but also aesthetic and space disadvantages.

Alternatively, it is possible to connect the centralized water treatment device directly to the main delivery system: this solution, however, is ineffective, because it implies a massive use of treated water also for all those purposes which do not require it (water for washing, for cooking, and so on), and hence it needlessly overloads the water treatment system, with unavoidable extra costs (due to frequent filter replacement, maintenance works, working inspections, etc.).

A different approach, which is advantageous for the localized use of treated water, integrates the treatment device at the output location, namely in the taps themselves or in the end portion of the outlet pipe.

Examples of filtering devices applied to the output location are disclosed in U.S. Pat. No. 5,976,362, U.S. Pat. No. 5,152,464, U.S. Pat. No. 5,020,569, U.S. Pat. No. 4,863,103, U.S. Pat. No. 4,770,768, U.S. Pat. No. 4,172,796, U.S. Pat. No. 4,107,046, U.S. Pat. No. 3,853,761, and U.S. Pat. No. 816,517.

In all these cases, however, the water delivered by the tap passes entirely through the filtering system and therefore, in order not to prematurely impair filter effectiveness, such devices must be mounted on water system outputs which are only used to deliver drinking water.

This last problem is instead absent in the solutions disclosed in U.S. Pat. No. 738,486 and U.S. Pat. No. 712,868, since they envisage mounting the filtering device on a suitable side branch of the end pipe of the system. However, these last solutions are bulky, impractical to carry out on standard systems and aesthetically unsatisfactory.

Along the same lines as this local treatment approach, an aesthetically pleasant and globally acceptable solution is disclosed in U.S. Pat. No. 5,744,033, U.S. Pat. No. 5,823,229, U.S. Pat. No. 5,858,215 and U.S. Pat. No. 6,093,313 belonging to Moen Inc., on the basis of which the main claim preamble is construed.

In this case the filtering device is housed in the body of a water-supplying showerhead featuring two alternatively selectable delivery holes. Water from the main flows in the usual way into the showerhead inlet and then follows two alternative paths, one towards the head of the showerhead and the other passing through the treating element (a filter cartridge), which paths feature two separate outlets at the two delivery holes, one for treated water and the other for untreated water. A control member to alternatively intercept one of the two delivery holes is further provided, so that only the type of water according to the user's wishes at that time is drawn.

However, the problems deriving from this solution are evident. Firstly, the complexity and bulk of the showerhead to removably house the filtering device must be mentioned. Furthermore, since water treatment occurs locally in the showerhead, each water system showerhead intended to provide treated water is to be equipped with a filter cartridge, which must be subsequently replaced.

It is hence an object of the present invention to overcome all the prior art disadvantages by supplying a system featuring a simple and economical showerhead which can be advantageously installed in a traditional system, but which at the same time allows the user to exploit the peculiar advantages of a centralized water treatment system.

A further object of the invention is to supply a showerhead particularly suitable for use in a system of the kind illustrated above.

Finally, a further object is to supply a hose pipe linking the showerhead to the water system, which pipe may be mounted in a system such as the one described above.

BRIEF SUMMARY OF THE INVENTION

According to the invention, the objects listed above are achieved by means of a water delivery system, a showerhead and corresponding hose as described in their essential features in the attached claims.

Further features and advantages of the system and of the devices according to the invention will in any case be clearer from the following detailed description of preferred embodiments of the invention, given by way of example and illustrated in the accompanying drawings.

BRIEF DESCRIPTION OF THE SEVERAL VIEWS OF THE DRAWINGS

FIG. 1 is a longitudinal cross-sectional view of a showerhead according to the invention, viewed along Section 1-1 of FIG. 2;

FIG. 1A is a sectional view of the showerhead of FIG. 1, viewed along the line 1-1 in FIG. 1;

FIG. 2 is a plan view of the lower side of the showerhead of FIG. 1;

DETAILED DESCRIPTION OF THE INVENTION

Figure 3:
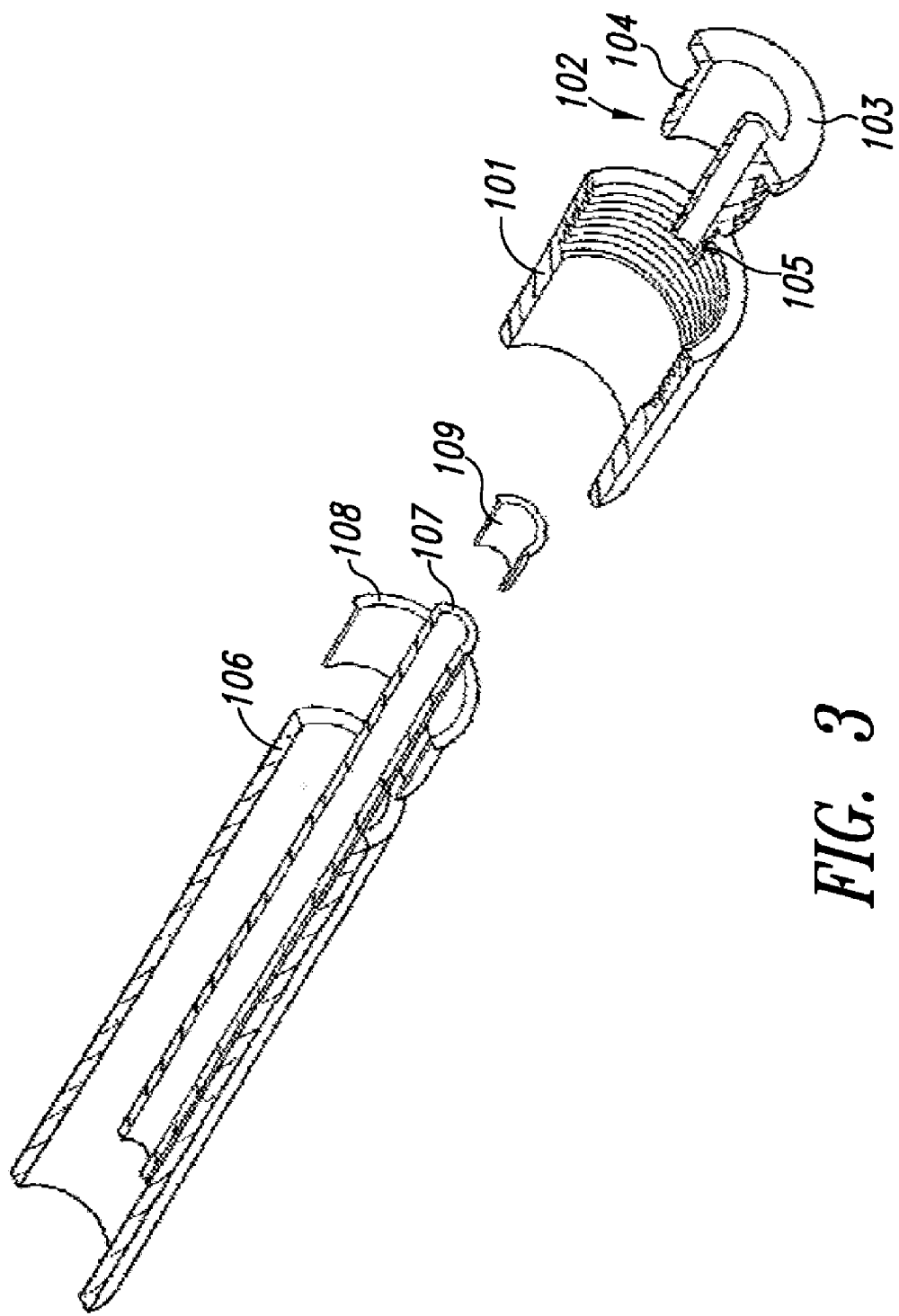
FIG. 3 is a longitudinal sectional exploded view of a pipe according to the invention.

As can be seen in FIG. 1, a water delivery showerhead features, in a manner known per se, a housing body 1 consisting of a handle portion 1a and of a head portion 1b.

The head portion 1b houses a delivery device T known per se, for example like the one described in the international application PCT/EP01/13525 in the name of the same Applicant.

Inside the handle portion 1a is housed a first main conduit 2 transporting the water to the delivery device T.

According to the invention, inside the handle 1a a secondary conduit 3 is further provided, which does not communicate with the first conduit 2, which terminates in a base coupling 100 of the handle 1a with an inlet 3a distinct from the inlet 2a of the first conduit 2.

According to the preferred embodiment illustrated in the figures, the two conduits 2,3 are integrally molded, one (the secondary one) inside the other (the main one). In this case the inlet 3a is adjacent to and—at least partly—surrounded by the mouthpiece of the inlet 2a (FIG. 1A).

The path of the secondary conduit 3 features an S-shaped portion bending downwards (in FIG. 1) near the junction between the handle 1a and the head 1b, wherein the housing of an on-off valve 4 is provided. The conduit 3 then leads to a short L-shaped pipe ending in an outlet spout 5 which terminates externally to the housing body 1, facing in the same direction as the main delivery device T.

According to a preferred embodiment, the valve 4 simply consists of a stem 6 supporting a shutter 7 made of an elastic material (for example rubber), intended to seal a seat hole 8 provided in the S-shaped portion of the conduit 3. The stem 6 is guided sliding in the longitudinal sense by closing walls 9 of the valve body and by a small top bell end 10 integral with the S-shaped portion of the conduit 3.

At the hole where the stem 6 protrudes outward from the closing wall 9 a watertight seal 11 is provided.

Despite this design forcing the shutter 7 to be automatically pushed in a closed position (i.e., abutting the seat hole 8) by the water pressure in the conduit 3, an elastic element (not shown) is preferably further provided between the shutter 7 and the opposite wall of the conduit 3: in this way an elastic pressure is ensured, which tends to keep the valve in a closed position.

The stem 6 externally ends in an operation button 12, preferably covered and joined to the remaining handle portion 1a by a dow 13 made of a soft material, such as rubber or other silicone-based material.

According to a preferred embodiment of the invention, the dow 13 also covers the area surrounding the outlet spout 5, so as to aesthetically join the whole lower surface of the handle.

On the base coupling 100 of the showerhead a fitting is further engageable, of a flexible tube, which is externally of a conventional type (for example ½ inch) and hence capable of sliding freely within a standard kitchen sink through-hole. This design, as known, allows the user to provisionally disengage the showerhead from its bracket and extend or shorten its reach simply by pulling or releasing the flexible tube inside its bay underneath the sink.

Figure 4:
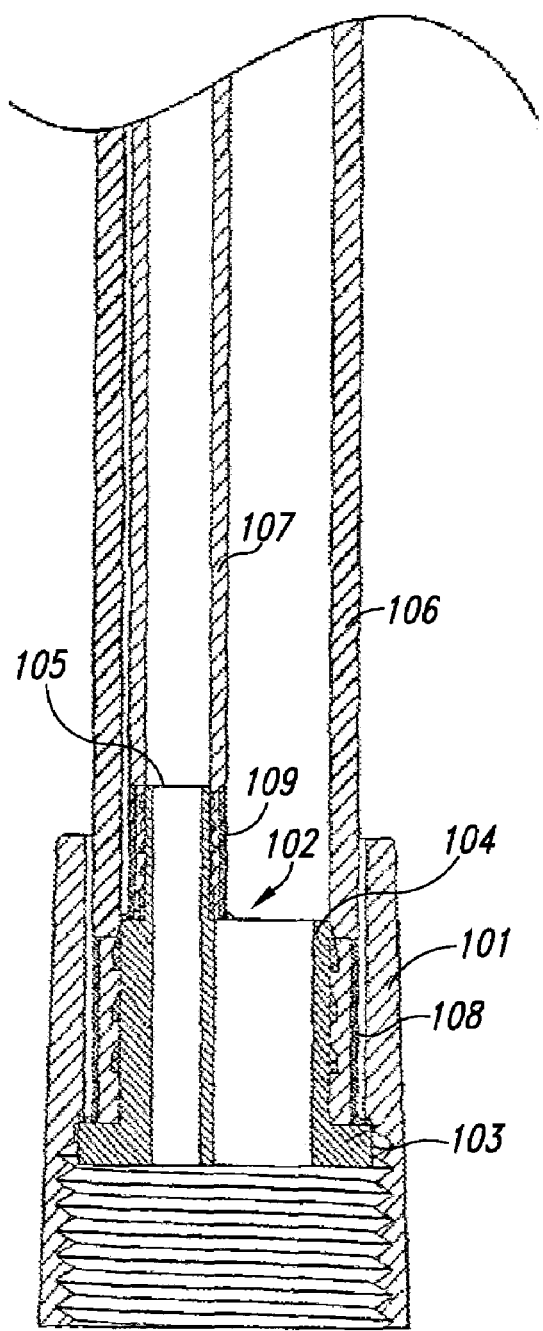
FIG. 4 is an enlarged and partial sectional view of the pipe of FIG. 3.

Moving to FIGS. 3 and 4, the flexible tube (not shown) is hence connected to a hose coupling threaded on the inside 101, capable of engaging with the showerhead coupling threaded on the outside 100.

According to the invention, the hose coupling 101 is capable of locking a special distributor body 102 on the mouthpiece of the coupling 100, said distributor featuring two pipe couplings, one distinct from the other.

In particular, in the embodiment shown in FIGS. 3 and 4, the distributor body 102 is integrally molded and features a flange 103, intended to rest against the showerhead mouthpiece 100, from which a short pipe or hollow cylindrical element 104 projects, inside which—adjacent to its surface—projects a second hollow cylindrical element 105, of a smaller diameter and extending over a longer length.

The two cylindrical elements 104 and 105 are intended to engage with the end of delivery pipes of a suitable diameter, 106 and 107 respectively. To that purpose the outer surfaces of the two cylindrical elements 104 and 105 preferably feature notched portions which aid retention, as can be seen in FIG. 4. The ends of pipes 106 and 107 are force-fitted over the ends of the elements 104 and 105 and locked there also with the aid of holding clamps 108 and 109.

As can be guessed from the design of the distributor body 102, the smaller diameter delivery pipe 107 is housed inside the larger diameter delivery pipe 106.

Finally, outside the larger pipe 106 a flexible covering pipe is provided which, in the last resort, determines the overall dimensions of the tube.

Since the distributor body 102 is not symmetrical and is intended to link the main conduit 2 of the showerhead with the cylindrical element 104 and with the pipe 106, as well as linking the secondary conduit 3 of the showerhead with the cylindrical element 105 and hence with the pipe 107, a spigot or centering element (for example a detent on the flange 103 intended to engage with a groove in the coupling 100) is preferably provided to couple the two components in a univocal way.

This last feature may be superfluous, should the connection distributor body 102, in another embodiment, be conceived circularly symmetrical (that is, with the two hollow cylindrical elements arranged coaxially): in this case even the two mouthpieces 2a and 3a in the showerhead coupling would have the same symmetry and it would not be necessary to ensure a univocal angular matching between the distributor body 102 and the coupling 100. However, this embodiment conversely presents molding problems, especially concerning the inner conduits of the showerhead, which, although surmountable, may discourage the realization of such embodiment due to the higher manufacturing costs.

At the opposite end the two delivery pipes 106 and 107 are connected to a similar distributor body (not shown) which suitably separates the inlet of the two delivery pipes. These last two can therefore be connected to two end portions of distinct delivery systems, in particular of the untreated-water system (coming directly from the main) and of the treated-water system featuring a centralized treatment and/or softening device.

Preferably, the untreated-water system can be operated through the conventional taps provided on the sink, while the treated-water system can always be under pressure and water spillage is prevented solely by the valve 4 being closed.

The flexible tube, containing the two inner pipes 106 and 107, advantageously connects the showerhead of the invention with the pipe connections of the two systems (mentioned above) which are located in a hidden position, in particular underneath a kitchen sink: to that purpose the flexible tube advantageously features a standard size, so that it may fit into the corresponding hole bored on the sink and disappear underneath it. Should the flexible tube be cut to a sufficiently long length, it normally stays loose (for example with a deep loop) underneath the sink and may be withdrawn through the aforementioned hole whenever it is required to detach the showerhead from its bracket to reach other areas to be washed.

As can be well understood, thanks to the system of the invention, it is possible to obtain an advantageous combination between a showerhead of substantially standard overall dimensions and a separate and centralized water treatment system which is itself extremely efficient because it is designed—according to a known technique—to the size and arrangement—most suitable to its purpose, with no accessibility or size restraints being imposed by the showerhead.

During normal operation, the showerhead delivers untreated water, the flow of which may be adjusted by operating the sink taps. Whenever one wishes to draw water for drinking, it is instead sufficient to press the button 12 to open the valve 4 and obtain a flow of treated water. Evidently, in this way it is possible to draw treated water only in the minimal quantities really necessary, which goes to the benefit of the duration of the filters used in the treatment device, with advantages in terms of costs and therefore achieving one of the set objects.

Furthermore, given the simplicity of the showerhead according to the invention—which, on the other hand, is not fitted with any water treatment means—the same has an extremely limited purchasing cost and may therefore be used as a standard fitting on all water delivery points in a building, exploiting at the same time a single distribution system of treated water, to the advantage of efficiency and economy of the system, thus achieving a further object of the invention.

Lastly, the sole presence of the two conduits 2 and 3 inside the handle 1*a* of the showerhead does not significantly affect the overall dimensions—especially if one considers that the secondary conduit 3 may have a smaller diameter than the main one 2. Hence the appearance and the size of the showerhead according to the invention may remain similar to those of showerheads traditionally employed in this field, upholding users' liking of this item and thus achieving another object of the invention.

It is understood, however, that the invention is not limited to the specific embodiments illustrated above, which represent only non-limiting examples of the scope of the invention, but that a number of changes may be made, all within the reach of a skilled person in the field, without departing from the scope of the invention.

The invention claimed is:

1. Water delivery system comprising a showerhead with two delivery points, at least one of which has an on-off valve, and at least one supply pipe carrying untreated water, characterized in that
said showerhead comprises two separate conduits connecting the two delivery points with a coupling at the base of a handle thereof, one of the two conduits being located at least partly inside the other of the two conduits, the two conduits being distinct from and not in fluid communication with one another, and one of the two conduits being configured to deliver water only out of one of the two delivery points and the other of the two conduits being configured to deliver water only out of the other delivery point,
said supply pipe carrying untreated water being associated with a secondary supply pipe carrying treated water, both supply pipes being enclosed in a flexible tube,
a proximal end of said flexible tube being coupled with said showerhead coupling, and a distal end of said flexible tube being intended to disappear from the user's sight, said distal end having two distinct supply ends, one supply end adapted to be connected to the supply pipe carrying untreated water and the other supply end adapted to be connected to the supply pipe carrying treated water, respectively.

2. Water delivery system as claimed in claim 1, wherein the two showerhead delivery points are distinct and one of the two separate conduits delivering treated water is cut-off by a valve normally kept in a closed position and which may be operated manually.

3. Water delivery system as claimed in claim 2, wherein said valve has the shape of a longitudinally translatable stem and is provided with a shutter, the stem protruding outward from the conduit with an operating button and being arranged so that the shutter is pushed in a closed position by the pressure of the water in the conduit.

4. Water delivery system as claimed in claim 3, wherein the stem of said valve slides within an S-shaped portion of the corresponding conduit and comes out orthogonal to an L-shaped end portion of said conduit.

5. Water delivery system as in claim 1, wherein an inlet for one of the two conduits is adjacent to and at least partially surrounded by an inlet for the other of the two conduits.

6. Water delivery system as claimed in claim 1, wherein said flexible tube consists of
an outer flexible casing, which houses said separate and flexible supply pipes, and
a first and a second connection body, the first connection body being intended to connect said flexible supply pipes with the coupling of said showerhead, the second connection body being intended to connect said flexible supply pipes to the two outlets of distribution systems delivering treated water and untreated water.

7. Water delivery system as claimed in claim 6, wherein said flexible supply pipes are one inside the other.

8. Water delivery system as claimed in claim 7, wherein said first connection body consists of a flange from which projects a first hollow cylindrical element inside which projects a hollow cylindrical element, of a smaller diameter, but of a greater length than the first one, such two cylindrical elements being arranged so as to fit an end of each of said flexible supply pipes thereon.

9. Water delivery system as claimed in claim 8, wherein said connection body further comprises an alignment feature to ensure a univocal angular coupling with the showerhead coupling.

10. Water delivery system as claimed in claim 8, wherein said connection body is integrally molded.

11. Water delivery system as claimed in claim 9, wherein said connection body is integrally molded.

12. A showerhead comprising:
a first outlet and a distinct second outlet;
a first conduit and a distinct second conduit located at least partially inside the first conduit, the two conduits not being in fluid communication with one another;
the first conduit configured to be in fluid communication with a first water supply and the second conduit configured to be in fluid communication with a distinct second water supply;
the first conduit configured to deliver water from the first water supply to the first outlet and the second conduit configured to deliver water from the second water supply to the second outlet; and the showerhead configured to allow selective delivery of water from the second conduit.

13. The shower head of claim 12, further comprising a valve connected to the second conduit configured to allow the selective delivery of water from the second water supply out the second outlet.

14. The shower head of claim 12, wherein the second water supply is from a centralized distribution system of treated water.

15. The shower head of claim 14, wherein the first water supply is from an untreated water source.

16. The shower head of claim 15, wherein the showerhead is configured to allow selective delivery of treated water through the second conduit and out the second outlet while untreated water is simultaneously delivered through the first conduit and out the first outlet.

17. The shower head of claim 16, wherein the selective delivery is accomplished by manual selection of a valve means connected to the second conduit.

18. The shower head of claim 17, wherein said valve means has the shape of a longitudinally translatable stem and is provided with a shutter, the stem protruding outward from the second conduit with an operating button and being arranged so that the shutter is pushed in a closed position by a pressure of the treated water in the second conduit.

* * * * *